(12) United States Patent
Daraiseh et al.

(10) Patent No.: US 10,060,552 B2
(45) Date of Patent: Aug. 28, 2018

(54) ADAPTIVE HIGH INTEGRITY ESD SYSTEM

(71) Applicant: Saudi Arabian Oil Company, Dhahran (SA)

(72) Inventors: Abdelghani Daraiseh, Dhahran (SA); Patrick S. Flanders, Dhahran (SA); Juan R. Simeoni, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 90 days.

(21) Appl. No.: 15/157,951

(22) Filed: May 18, 2016

(65) Prior Publication Data

US 2017/0335992 A1 Nov. 23, 2017

(51) Int. Cl.
*G01L 27/00* (2006.01)
*F16K 37/00* (2006.01)
*F16K 17/36* (2006.01)
*F16K 31/06* (2006.01)

(52) U.S. Cl.
CPC ............ *F16K 37/005* (2013.01); *F16K 17/36* (2013.01); *F16K 31/06* (2013.01); *F16K 37/0041* (2013.01)

(58) Field of Classification Search
USPC ......................................................... 73/1.72
See application file for complete search history.

(56) References Cited

U.S. PATENT DOCUMENTS

| | | | | |
|---|---|---|---|---|
| 5,197,328 A * | 3/1993 | Fitzgerald | ........... | F16K 37/0091 137/487.5 |
| 8,074,512 B2 * | 12/2011 | Al-Buaijan | ........... | F15B 19/005 73/168 |
| 8,262,060 B2 * | 9/2012 | Heer | .................. | G05B 23/0256 137/554 |
| 9,534,617 B2 * | 1/2017 | Meinhof | ............... | F15B 19/005 |
| 2006/0219299 A1 * | 10/2006 | Snowbarger | ........ | F16K 37/0091 137/487.5 |
| 2008/0163936 A1 * | 7/2008 | Boger | ..................... | F15B 5/006 137/455 |
| 2010/0187456 A1 * | 7/2010 | Heer | ........................ | G05B 9/02 251/129.03 |
| 2010/0315069 A1 * | 12/2010 | Heer | .................. | G05B 23/0256 324/207.11 |
| 2011/0054828 A1 * | 3/2011 | Junk | .................. | G05B 23/0256 702/125 |

FOREIGN PATENT DOCUMENTS

WO 2006105523 A2 1/2015

OTHER PUBLICATIONS

International Search Report and Written Opinion for co-pending PCT/US2017/033580; dated Aug. 10, 2017 (16 pages).

* cited by examiner

*Primary Examiner* — Eric S McCall
*Assistant Examiner* — Mohammed E Keramet-Amircola
(74) *Attorney, Agent, or Firm* — Abelman, Frayne & Schwab

(57) ABSTRACT

A valve integrity manager is coupled with a servo or stepper motor to direct micro stroke testing of emergency shutdown valves. During testing, the system orders a closure of 20-25% of an emergency shutdown valve, providing data that either confirms the operability of the valve or a deficiency, while minimizing any effect on process variables.

22 Claims, 6 Drawing Sheets

ADAPTIVE HIGH INTEGRITY ESD SYSTEM

FIELD OF THE INVENTION

The present invention relates to a system to automatically perform micro strokes of emergency shutdown valves. The micro strokes produce a small percentage of the full stroke of the valve, allowing normal process operations to continue while confirming that the valve would respond appropriately to an emergency shutdown command.

BACKGROUND OF THE INVENTION

To protect plant equipment and personnel, in addition to protecting neighboring property, people, and the environment, many industrial plants include emergency shutdown (ESD) valves designed to interrupt process flow in the event of an emergency, such as a pipe rupture. ESD valves are actuated valves that operate under fail-safe principles, forming part of a safety instrumented system. An ESD valve actuator drives its associated ESD valve through pneumatic or hydraulic pressure, with energy being stored with a compressed spring (in the case of single-acting actuators) or with energy being stored with compressed pneumatic or hydraulic fluid (in the case of double-acting actuators).

ESD valves require periodic testing to maintain their operability and to confirm that they are operable. However, a full stroke of the valve interrupts process flow, which is frequently impractical and economically undesirable. As a result, full stroke tests are typically only performed once every 3-5 years.

Another method of testing ESD valve operability that does not require the complete interruption of process flow is a partial stroke test. Partial stroke tests have historically driven ESD valves to approximately 10-30% closure. While not completely interrupting process flow, such a partial closure nevertheless has a significant impact on process variables. Partial stroke tests require that an operator be present at the facility, and preparatory steps need to be taken by operation, maintenance and inspection organizations prior to and during the test. As a consequence of the effect of a partial stroke test on process variables, and as a consequence of the manpower costs associated with partial stroke tests, they are typically only performed every 3-12 months.

There are a number of other disadvantages associated with the current partial-stroke devices. Some models can operate with a pneumatic actuator, and other models can operate with a hydraulic actuator, but there is no partial-stroke device that can interchangeably support both types of actuators. The main ESD solenoid valve cannot be subjected to a full trip test, but rather a separate solenoid valve that is independent from the safety loop is required for such a full trip test. Actuator quick exhausts cannot be tested with the current partial-stroke devices.

Another disadvantage is that the precise amount of closure (i.e., within the typical 10-30% closure range) is generally established for a particular valve based upon operating points and process variables that occur during a test. When the valve is repeatedly tested with a partial stroke to the same percentage of closure, this increases the possibility of creating a crest or ridge on the valve obturator. Depending on the process, this ridge could result from a number of sources, including pipe scaling, obturator coating, valve internal seals, hydrates, and precipitated elemental sulfur. Once a ridge on the valve obturator develops, all subsequent partial stroke tests may indicate the valve is functioning properly, while in reality, an actual closure demand may fail due to the valve obturator jamming on the seat, locking the ESD valve in place instead of going to its fail-safe position.

What is required is a system to automatically perform micro strokes of emergency shutdown valves, driving them to approximately 20-25% closure. The smaller level of closure will reduce the impact on process variables, and the automation of the test will reduce manpower expenses. The system should preferably allow for movements of 1% or less, depending on the resolution of the emergency shutdown valve and actuator, and will drive emergency shutdown valves to varying degrees of closure, avoiding the formation of ridges on obturators. The micro stroke system allows for a full trip in the event of an emergency shutdown demand. Such a system would therefore enhance the reliability of a critical safety system, while reducing costs over the long term.

SUMMARY OF THE INVENTION

The above problems are resolved and other advantages described below are achieved by the system of the invention which provides a valve integrity motor capable of automatically performing micro strokes of emergency shutdown valves, driving them to approximately 20-25% closure.

Micro strokes at performed at different closing percentages and at different speeds. Different closing percentages act to prevent the formation of obturator ridges. In addition, different closing speeds can be used to overcome a jam; thus, if a valve jams during an actual emergency shutdown demand, the system will retry closing at lower speeds, higher speeds, or a combination thereof, until closure is attained.

Each micro stroke can have a range of travel as low as 1% of closure. Several micro strokes are performed each month, without need for operator or maintenance intervention, other than confirming that the operating status is normal, or addressing any condition alerts. The micro stroke tests will typically be limited to a closure in the 1-5% in each test, either in the closing direction or in opening the valve, resulting in minimal impact on process variable values.

The invention allows monitoring several performance characteristics of a valve, such as close time per stroke closure level, open time per stroke closure level, initial stroking response time, and calibration of valve closure versus stroking target.

The invention allows for better detection of valve performance and readiness, and reduces the probability of failures on demand over prior art systems employing partial stroke methods. The invention can be easily integrated into existing emergency shutdown systems, and the capital cost will eventually be paid for by cost savings from the elimination of the man hours associated with prior art partial stroke testing methods.

BRIEF DESCRIPTION OF THE DRAWINGS

The present invention will be further described below and in conjunction with the accompanying drawings in which.

To facilitate an understanding of the invention, the same reference numerals have been used where appropriate to designate the same or similar elements that are common to the figures.

DETAILED DESCRIPTION OF THE INVENTION

Figure 1:
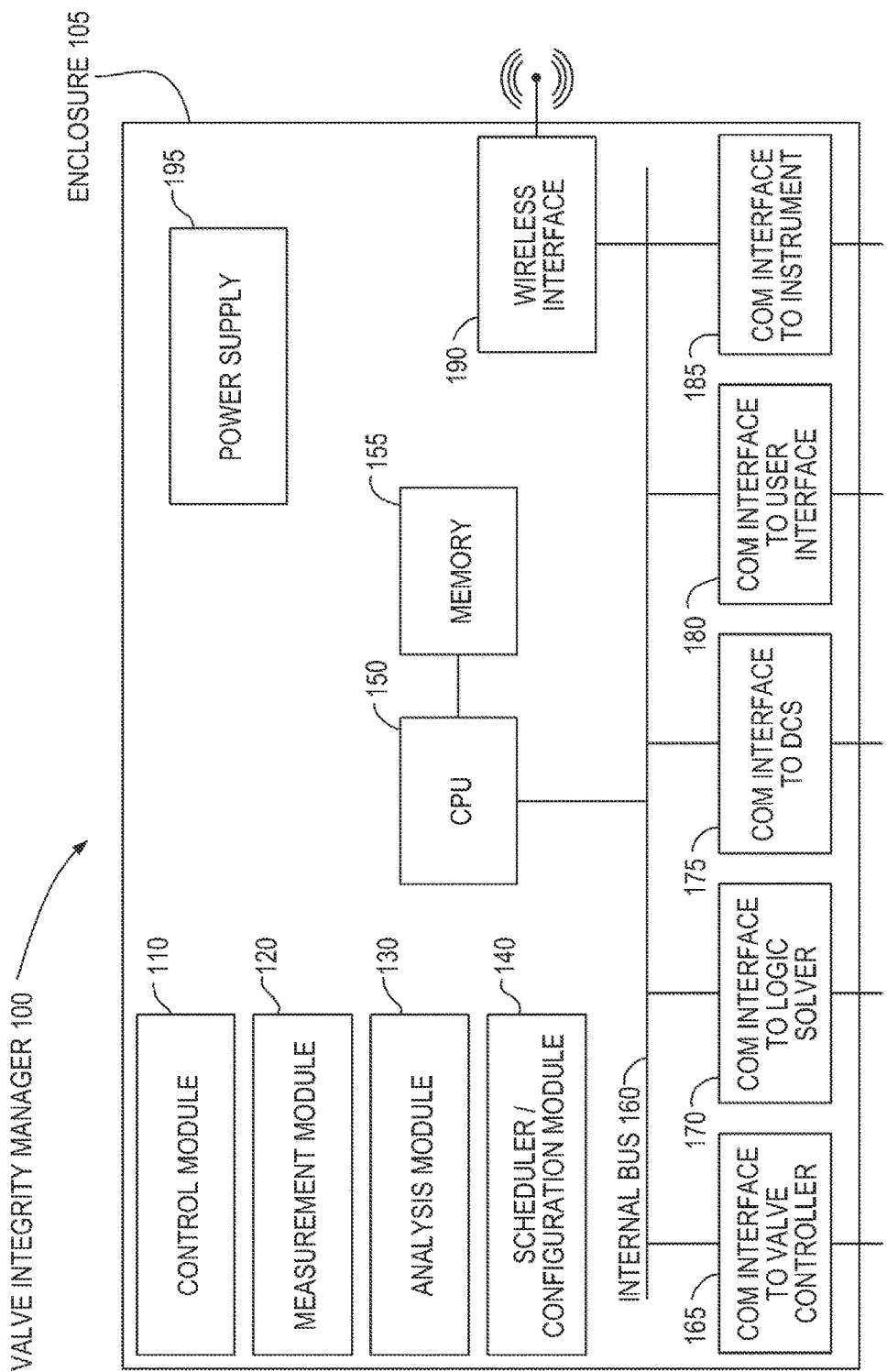
FIG. 1 is a schematic diagram of a valve integrity manager in accordance with the invention.

Referring to FIG. 1, the valve integrity manager 100 comprises an enclosure 105 that houses a central processing unit 150 coupled to non-volatile memory 155. Central processing unit 150 is wired to an internal bus 160, to which is also wired a valve controller communication interface 165, a logic solver communication interface 170, a distributed control system communication interface 175, a user communication interface 180, an instrument communication interface 185, and a wireless interface 190. Non-volatile memory 155 contains four software modules: a control module 110, a measurement module 120, an analysis module 130, and a scheduler/configuration module 140. These software modules are executed by the central processing unit 150.

Control module 110 directs a micro stroke to either open or close an emergency shutdown valve by a set percentage. For example, if the valve is fully open, control module 110 can perform a micro stroke to close by 2%. In another example, if the valve is 10% closed, control module 110 can perform a micro stroke to close another 4% to attain a 14% closure. In another example, if the valve is closed by 15%, control module 110 can perform a micro stroke to open the valve by 8% to reach a 7% closure.

Through internal bus 160, control module 110 via valve controller communications interface 165 with a valve controller, via logic solver communications interface 170 with a logic solver, via distributed control system communications interface 175 with a distributed control system (DCS), via user interface communications interface 180 with a user interface associated with the plant or facility, and via instrument communications interface 185 with instrumentation such as a differential pressure transmitter. Wireless interface 190 is also provided, allowing for wireless communications, such as remote diagnosis and visualization of valve status.

Valve integrity manager 100 also includes at least one power supply 195, to provide power for the operation of central processing unit 150 and other internal electronics, to provide power for a servo or stepper valve, and to provide current loop power for external differential pressure and position transmitters. A servo or stepper valve is a valve that is driven by a servo or stepper motor.

Control module 110 includes built-in logic to perform risk analysis. The risk analysis function reviews the process variables associated with the valve for the 48 hours prior to a micro stroke test, and will abandon the test in the event abnormal operations are detected. Control module 110 also monitors the process variables during a micro stroke test, and will abandon a micro stroke test if the process variables fluctuate in excess of a predetermined tolerance. Control module 110 also monitors the process variables immediately following a micro stroke test, to confirm that there has been no disturbance that needs to be brought to the attention of plant operators.

Control module 110 reports whether the result of a commanded micro stroke resulted in a success or failure.

In the event an emergency shutdown demand occurs during a micro stroke test, control module 110 will abandon the test and allow the emergency shutdown demand to proceed.

If the emergency shutdown valve jams during an actual emergency shutdown demand, control module 110 (in conjunction with the measurement module 120 and analysis module 130) will monitor to confirm the complete closure of the valve. If the valve fails to achieve closure within the prescribed time, or if it jams without movement for a predetermined period of time, control module 110 sends a message to the emergency system logic solver to initiate several attempts for closure. After receiving an Acknowledge signal from the logic solver, or if no signal is received from the logic solver within a predetermined period of time, control module 110 will perform several attempts to close the valve. Control module 110 will direct the opening of the valve by y % from the point at which it jammed, and then reattempt to close the valve at a first predetermined speed S1, which is preferably slower than the standard closing speed. If this attempt is not successful, control module 110 will direct the opening of the valve by y % from the point at which it jammed, and reattempt to close the valve at a second predetermined speed S2, which is preferably faster than the standard closing speed. If this attempt is still not successful, control module 110 will make additional attempts to open the valve y % from the point at which it jammed, while attempting to close the valve at different speeds, including speeds both slower and faster than the standard closing speeds. Whereas prior art devices only attempt to close a valve once, the inventors have discovered that certain jams (i.e., where the valve repeatedly stops moving at the same percentage of closure) can be overcome by retries, especially those performed at lower speeds. The system can also alter the force provided by the actuator, in a further attempt to achieve movement of a jammed valve.

Measurement module 120 measures the differential pressure across the emergency shutdown valve before and after a micro stroke test. In addition, measurement module 120 measures the actual closure percentage of the valve and the actual time required to achieve an x % movement of the valve.

Analysis module 130 compares and analyzes the percentage of closure as commanded by the micro stroke control module 110 versus the actual percentage of closure attained. Analysis module 130 also reviews the closure time from a starting point (whether fully open or partially closed) to an end point, and compares that closure time to a predicted value (such as the manufacturer's specification, or such as historic time data). Analysis module 130 also reviews the opening time from a starting point to an end point, and compares that closure time to a predicted value. Analysis module 130 also compares and analyzes the differential pressure, confirming that the differential pressure varies as predicted based upon the commanded movement of the emergency shutdown valve. Analysis module 130 also provides a user with a graphical representation of actual valve performance versus predicted valve performance.

Scheduler and configuration module 140 schedules the planned time and periodicity for micro stroke tests for a given valve. Scheduler and configuration module 140 issues command to control module 110 to initiate a micro stroke including the closure or opening level and the time to initiate the valve movement. Scheduler and configuration module 140 sends reminders to operations and maintenance prior to the micro stroke test, such as 24 hours in advance, 4 hours in advance, and 30 minutes in advance. Scheduler and configuration module 140 is user programmable with regard to the scheduling of micro strokes, the micro stroke sequence, and the number and timing of reminders. Tests can be performed automatically either at fixed intervals of time or randomly generated within a specified time period.

Note that the valve integrity manager 100 can also be programmed to perform traditional partial stroke and full stroke tests, but the novel aspects of the valve integrity manager 100 are the ability to perform micro stroke tests, in addition to the ability to reattempt moving a jammed valve at various speeds, to analyze valve performance, and to schedule tests, as described above.

Figure 2A:
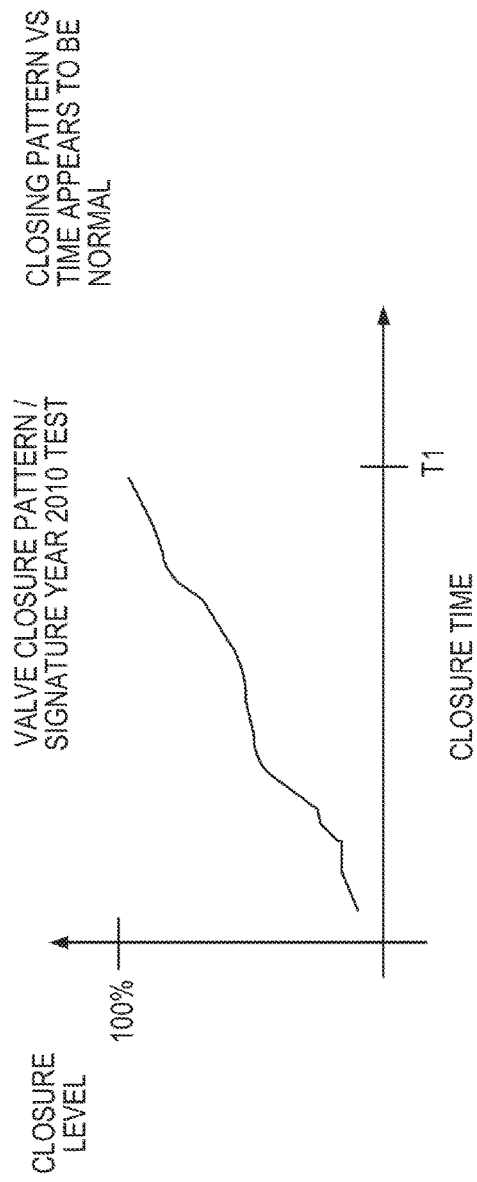
FIGS. 2A and 2B are plots of closure level versus closure time.
Figure 2B:
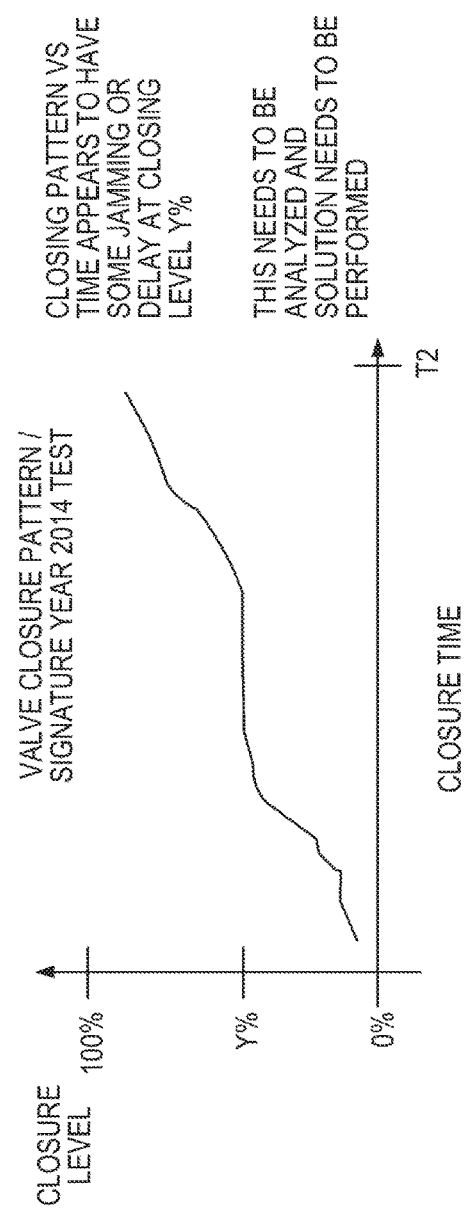

FIGS. 2A and 2B illustrate a closing pattern versus time of an ESD valve. FIG. 2A shows the closing pattern during a 2010 full stroke test, while FIG. 2A shows the closing pattern during a 2014 full stroke test. Analysis module 130 has tracked the performance of each closure. The 2010 test shows a normal closing pattern, but the 2014 test shows that the time to 100% closure was longer than predicted (i.e., compared to the manufacturer's predicted time or compared to the historic data of the 2010 test). The graphical representation of the valve performance provided by the analysis module 130 also shows that the valve movement stalled at Y % of closure for a period of time, before resuming movement. This data is valuable to plant maintenance personnel, who can determine if the valve requires maintenance, repair, or replacement.

Valve integrity manager 100 offers additional advanced testing methods. With a single command issued by an operator, either remotely (such as from a main control room) or locally (via a local control panel), valve integrity manager 100 tests all components of the final elements, including the main ESD solenoid valve, the actuator's quick exhaust or directional/poppet valves, the actuator and process ESD valve. Valve integrity manager 100 can also perform micro stroke (or partial stroke) tests at percentages of closing that are randomly generated, or that are based upon a predetermined maximum allowable process differential pressure. This reduces the risk of formation of ridges on the ESD valve obturator.

Valve integrity manager 100 directs testing and diagnosis based on both static and dynamic friction within the whole assembly of the final element. As will be understood by one of ordinary skill in the art, static friction and dynamic friction are two regimes of dry friction, which resists relative lateral motion of two solid surfaces in contact. Static friction exists between non-moving surfaces, while dynamic friction exists between moving surfaces. The valve integrity manager 100 can generate three separate and independent final element signatures based on purely static friction with micro stroke motion; an intermediate mix of static and dynamic friction with slow motion; and full dynamic friction with fast motion. These three independent valve signatures allow for true and meaningful diagnosis and trouble-shooting.

Valve integrity manager 100 allows the introduction of dampening of the actuator, slowing the movement of the valve after it has reached a given test position based on process differential pressure and/or on actuator instrument air or hydraulic fluid discharge pressure. This protects the mechanical integrity of the emergency shutdown valve and actuator by avoiding damaging vibrations and the generation of natural frequencies.

Valve integrity manager 100 can be used with either pneumatic or hydraulic actuators, single-acting spring return or double-acting. In order for the valve integrity manager 100 to achieve all the above goals, it must be able to accurately and precisely control the actuator position, speed, acceleration and force. This is achieved with the use of either a stepper motor or more expensive servo motor.

In a preferred embodiment, valve integrity manager 100 is provided as a stand-alone component, which can be integrated with a user's choice of a servo valve or stepper valve.

Another embodiment of the invention combines the valve integrity manager 100 with a servo valve or stepper valve.

A servo valve, that is, a servo motor paired with a control valve, has a number of advantages, including:
1. Lower power consumption. Servo motors only draw power when in use and proportionally to the signal.
2. Higher and almost constant torque/thrust capabilities across the range, typically up to 90% being available across the whole range.
3. Commonly available brushless DC and AC motors in various voltages for long life and high reliability.
4. Higher speed (normally up to 8000 rpm although higher speeds are available), higher accuracy, lower response time and constant performance regardless of whether rotation is clockwise or counterclockwise.
5. The ability to make the servo valve "fail-safe" at a set position in case of loss of power and/or signal.
6. High ambient temperature range, from −40° C. to 85° C.
7. The availability of servo controller/driver with standard communication interfaces and protocols such as Fieldbus, Modbus, RS485 or RS232.
8. Availability of electrical certifications for corrosive and/or hazardous areas, such as NEMA 4X.
9. Low failure rates (min. MTBF of 10000+ hours in continuous duty) and the ease of diagnostics' implementation.

A servo motor is defined as an automatic device that uses an error-correction routine to correct its motion, using a feedback device such as an encoder or resolver to control the motion parameters: position, speed, and acceleration. A servo motor consists of three major parts: a motor, control circuitry, and a potentiometer connected to the output shaft. The motor utilizes a set of gears to rotate the potentiometer and the output shaft at the same time. The potentiometer, which controls the angular position of the servo motor, allows the control circuitry to monitor the current angle of the servo motor. The motor, through a series of gears, turns the output shaft and the potentiometer simultaneously. The potentiometer feeds the angular position into the servo control circuit and when the control circuit detects that the position is correct, it stops the servo motor. If the control circuit detects that the angle is not correct, it turns the servo motor the correct direction until the angle is correct. Normally a servo motor is used to control an angular motion of between 0 and 180 degrees. Unless modified, it is not mechanically able to turn farther due to the mechanical stop build on to the main output gear.

Servos are widely used in robotics and automation. Servo motors are used across various automation fields specifically where the motor must be able to operate at a range of speeds without overheating, operate at zero speed while being able to retain its load in a set position, as well as operate at low speeds. Servo motors are utilized in industrial machine tools, CNC manufacturing machines and processes, aerospace in their hydraulic systems to contain system hydraulic fluid and in Oil & Gas E&P (Exploration and Production) environments. A servo motor is relatively small in size, yet very powerful. Large servo valves with brushless DC and AC servo motors are commonly available with a flow capacity Cv≥50, which exceeds the flow requirements to fully open and/or fully close large actuators in ≤2.0 seconds. A servo motor also draws power proportionally to the mechanical load.

Servo motors are controlled by a pulse width modulation (PWM) via a signal sent from a micro-controller output pin to the servo motor's control wire. Each pulse must meet specific parameters such as minimum pulse, a maximum pulse, and a repetition rate. The servo motor expects to see a pulse every 20 milliseconds, (0.02 seconds) and the length of each pulse will determine how far the servo motor rotates. Given these constraints, neutral is defined to be the position where the servo has exactly the same amount of potential rotation in the clockwise direction as it does in the counter clockwise direction. It is important to note that different servo motors will have different constraints on their rotation, but they all have a neutral position, and that position is always around 1.5 milliseconds.

The amount of power applied to the motor is governed by proportional control, such that if the shaft of the servo motor needs to turn a large distance, the servo motor runs at full speed, whereas if the servo motor needs to rotate only a small amount, the motor runs at a slower speed.

Servo motors operate on negative feedback, meaning that the control input is closely compared to the actual position via a transducer. If there is any variance between physical and wanted values, an error signal is amplified, converted, and used to drive the system in the direction necessary to reduce or eliminate the error.

The natural rotary motion of a servo motor is easily converted into linear motion via a lead screw and/or nut, typically PTFE-coated for extreme low friction, which provides anti-backslash and smooth operation.

All the above servo performances allow the valve integrity manager 100 to achieve its goals as it can accurately and repeatedly control the position of the ESD's actuator, its speed, acceleration and force.

The servo motor can position a pneumatic/hydraulic valve in a continuous and infinite range of positions within the given valve stroke, with a response time of ≤30 msec, accuracy of ±0.03% of the servo valve stroke, and overall linearity, dead-band and hysteresis of the whole final element assembly, including the emergency shutdown valve and actuator, of ≤0.5% whether the actuation is pneumatic or hydraulic.

In order to avoid a typical pitfall of servo motors, loss of position, it is necessary to couple/equip them with an optical encoder or resolver, to provide positioning and speed/acceleration feedback, and a brake, to maintain a given position under load. The use of an encoder or resolver creates a servo motor closed loop, wherein the driver is able to accurately and repeatedly control the position of the servo matching the input signal to the feedback.

An optical encoder is less expensive than a resolver. The optical encoder on a servo motor uses a rotating shutter to interrupt a beam of light across an air gap between a light source and a photo-detector. However, over time the wear associated with the rotating shutter reduces the longevity and reliability of the encoder. Optical encoders are also more accurate than resolvers, and easier to implement.

A resolver on a servo motor uses a second set of rotor and stator coils called the transformer to induce rotor voltages across an air gap. Because a resolver does not use any electronic components, it is very robust, being inherently shock-resistant and having a high ambient temperature range, commonly up to 255° C. Thus, a resolver may be selected for harsh environments or when longevity is a concern.

The servo motor brake is perfect for holding applications, it is typically 24 VDC and it is attached to the rear of the servo motor. The servo motor brake has a low voltage design for applications that are susceptible to weak battery, brown out, or voltage drop over long wiring runs. When electric power is applied to the servo motor brake, the armature is pulled by the electromagnet force in the magnet body assembly, which overcomes the spring action. This allows the friction disc to rotate freely. When electrical power is interrupted, the electromagnetic force is removed and the pressure spring mechanically forces the armature plate to clamp the friction disc between itself and the pressure plate.

Figure 3:
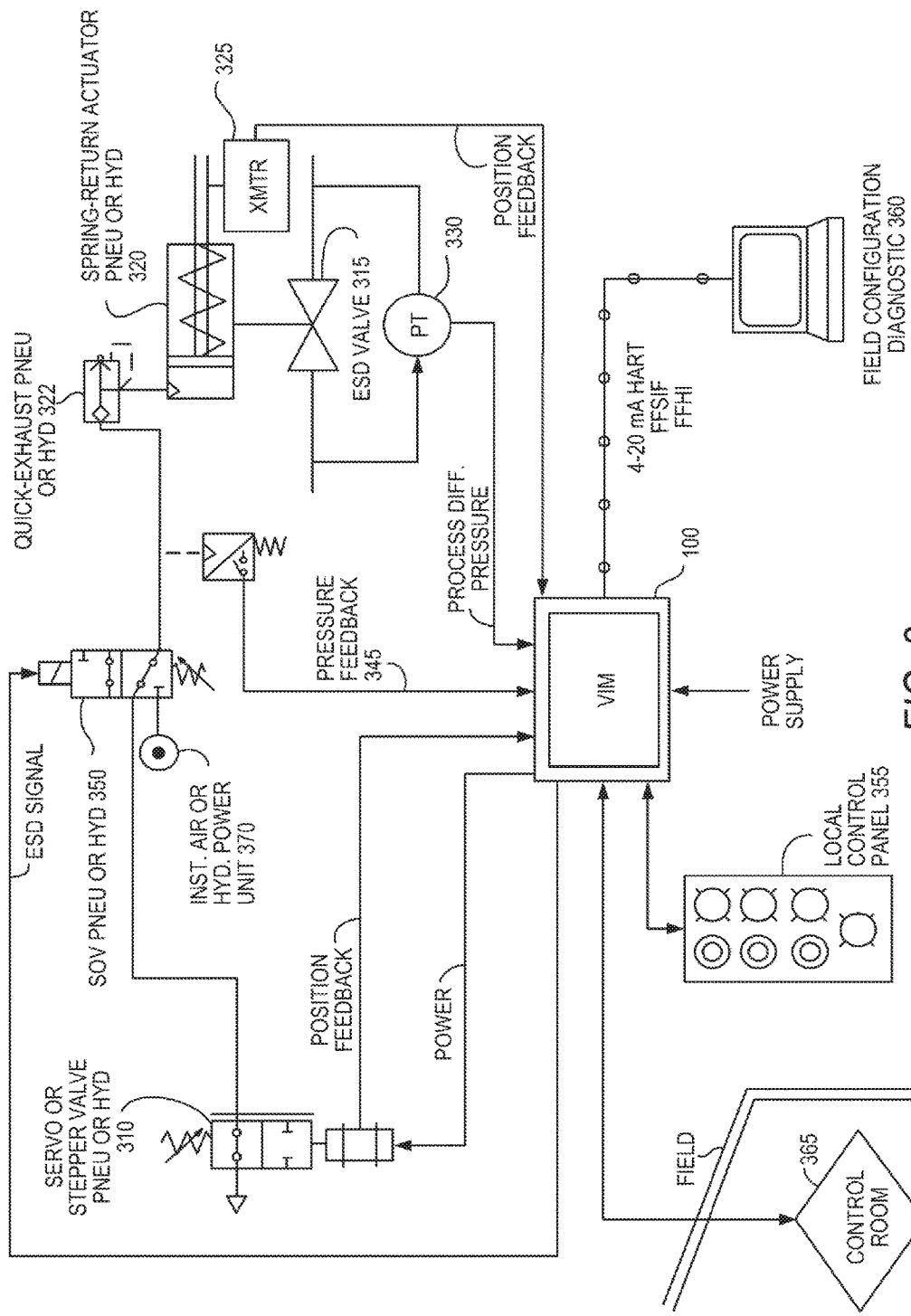
FIG. 3 is a schematic diagram of a valve integrity manager incorporated into an emergency shutdown system safety loop for single-acting spring-return actuators.

FIG. 3 illustrates an embodiment of a complete safety system for emergency shutdown valve 315, which is operated by a pneumatic or hydraulic spring-return actuator 320. Position transmitter 325 is mounted on the spring-return actuator 320 and provides position feedback to valve integrity manager 100. A differential pressure transmitter 330 is installed across the emergency shutdown valve 315 and provides process differential pressure to valve integrity manager 100.

The spring-return actuator 320 is provided with quick exhaust and/or exhaust valves 322, which connects to the switched port of three-way solenoid valve 350. The switched port is switched either to a supply port, receiving either instrument air or hydraulic fluid from power unit 370, or to an exhaust port, which is connected to servo or stepper valve 310. Solenoid valve 350 is controlled electrically by an emergency shutdown signal from valve integrity manager 100, which will govern the switching between the supply port and the exhaust port. The supply port will be selected for emergency shutdown operations, in which case the quick-exhaust and/or exhaust valves 322 are also fully exercise. The exhaust port will be selected for normal operation and micro stroke testing. Servo or stepper valve 310 receives power from, and provides position feedback to, valve integrity manager 100. Servo or stepper valve 310 handles and controls the position, speed, acceleration and force of the actuator during a micro stroke test. Its provision for the separate emergency shutdown signal allows override of any micro stroke test, sending the servo or stepper valve 310 to its fail-safe position, allowing full stroke of the ESD valve 315 as required by its safety instrumented function. Thus, servo or stepper valve 310 is effectively part of the safety loop.

A pressure feedback switch 345 also provides information to valve integrity manager 100.

Valve integrity manager 100 provides data and can be controlled from the control room 365, from a local control panel 355, or from a field configurator 360.

Figure 4:
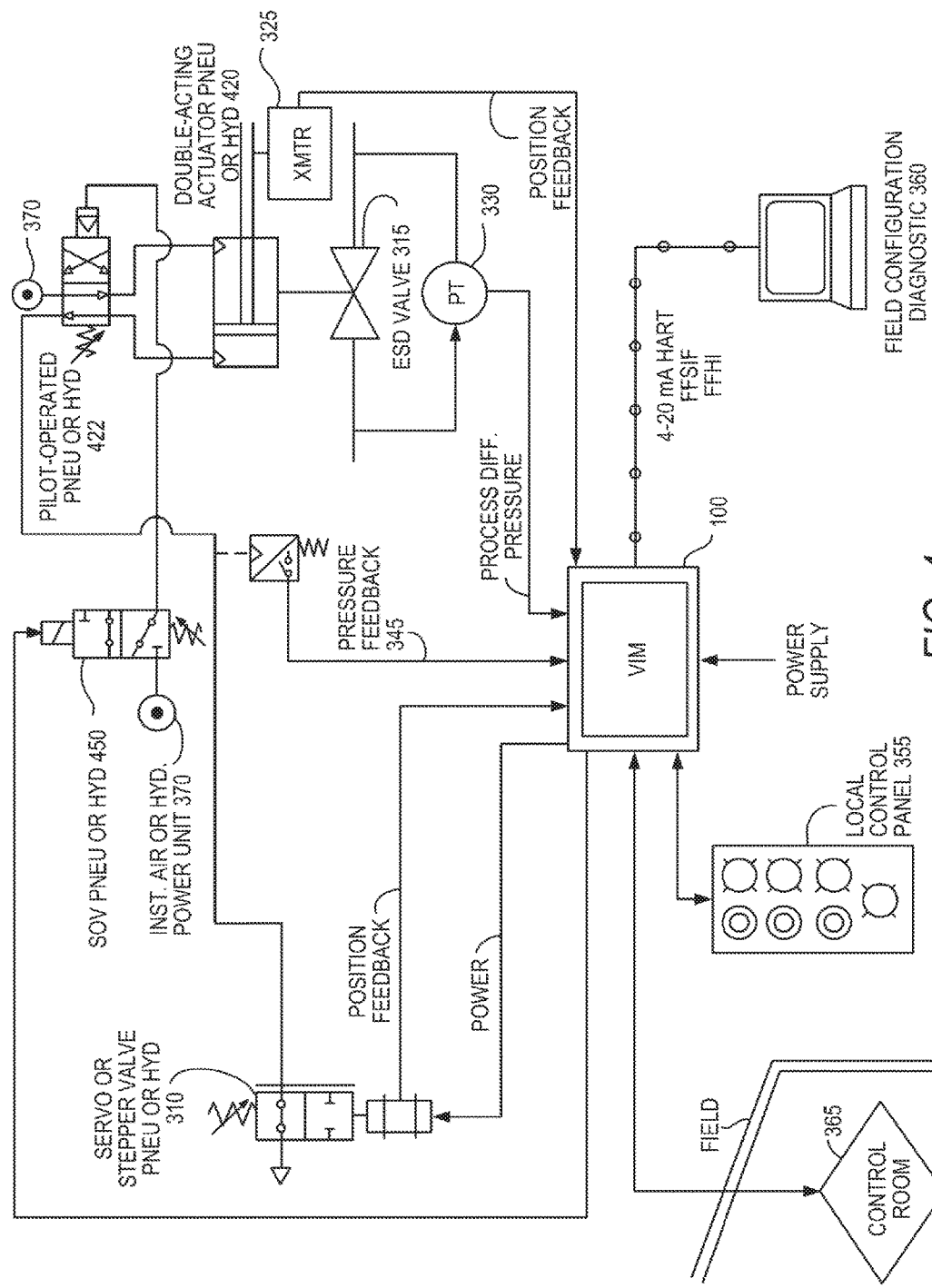
FIG. 4 is a schematic diagram of a valve integrity manager incorporated into an emergency shutdown system safety loop for double-acting pneumatic or hydraulic actuators.

FIG. 4 illustrates an alternative embodiment of a complete safety system for emergency shutdown valve 315, in which the pneumatic or hydraulic actuator 420 is of the double-acting type. As with the system shown in FIG. 3, position transmitter 325 is mounted on the actuator 420 and provides position feedback to valve integrity manager 100. A differential pressure transmitter 330 is installed across the emergency shutdown valve 315 and provides process differential pressure to valve integrity manager 100.

In this embodiment, solenoid valve 450 is only used for an emergency shutdown signal, and can be of the two-position type.

The double-acting actuator 420 is connected to the switched port of three-way pilot valve 422. The switched port is switched either to a supply port, receiving either instrument air or hydraulic fluid from power unit 370, or to an exhaust port, which is connected to servo or stepper valve 310. Pilot valve 422 is controlled pneumatically or hydraulically from power unit 370 via solenoid valve 450, which in turn is controlled electrically by a signal from valve integrity manager 100. The supply port of pilot valve 422 will be selected for emergency shutdown operations, whereas the exhaust port will be selected for normal operation and micro stroke testing. Servo or stepper valve 310 receives power from, and provides position feedback to, valve integrity manager 100. Servo or stepper valve 310 handles and controls the position, speed, acceleration and force of the actuator during a micro stroke test. Its provision for the separate emergency shutdown signal allows override of any micro stroke test, sending the servo or stepper valve 310 to its fail-safe position, allowing full stroke of the ESD valve 315 as required by its safety instrumented function. Thus, servo or stepper valve 310 is effectively part of the safety loop.

A pressure feedback switch 345 also provides information to valve integrity manager 100.

Valve integrity manager 100 provides data and can be controlled from the control room 365, from a local control panel 355, or from a field configurator 360.

Within the servo valve assembly, the weakest link is the servo motor with all its electro-mechanical parts and integrated electronics. Commonly available brushless servo motors have a mean time between failures (MTBF) of greater than 10,000 hours in continuous duty. However, MTBF only relates to the flat region of the bathtub curve, also called the useful life period in reliability engineering, and it is not a realistic measurement as it does not take into account the wear out cumulative failures of a product over time. A realistic metric that takes into consideration the wear out cumulative failures is the mean time to failure (MTTF), which can be extrapolated using a Weibull distribution for normal life and wear-out populations of servo motors.

Figure 5:
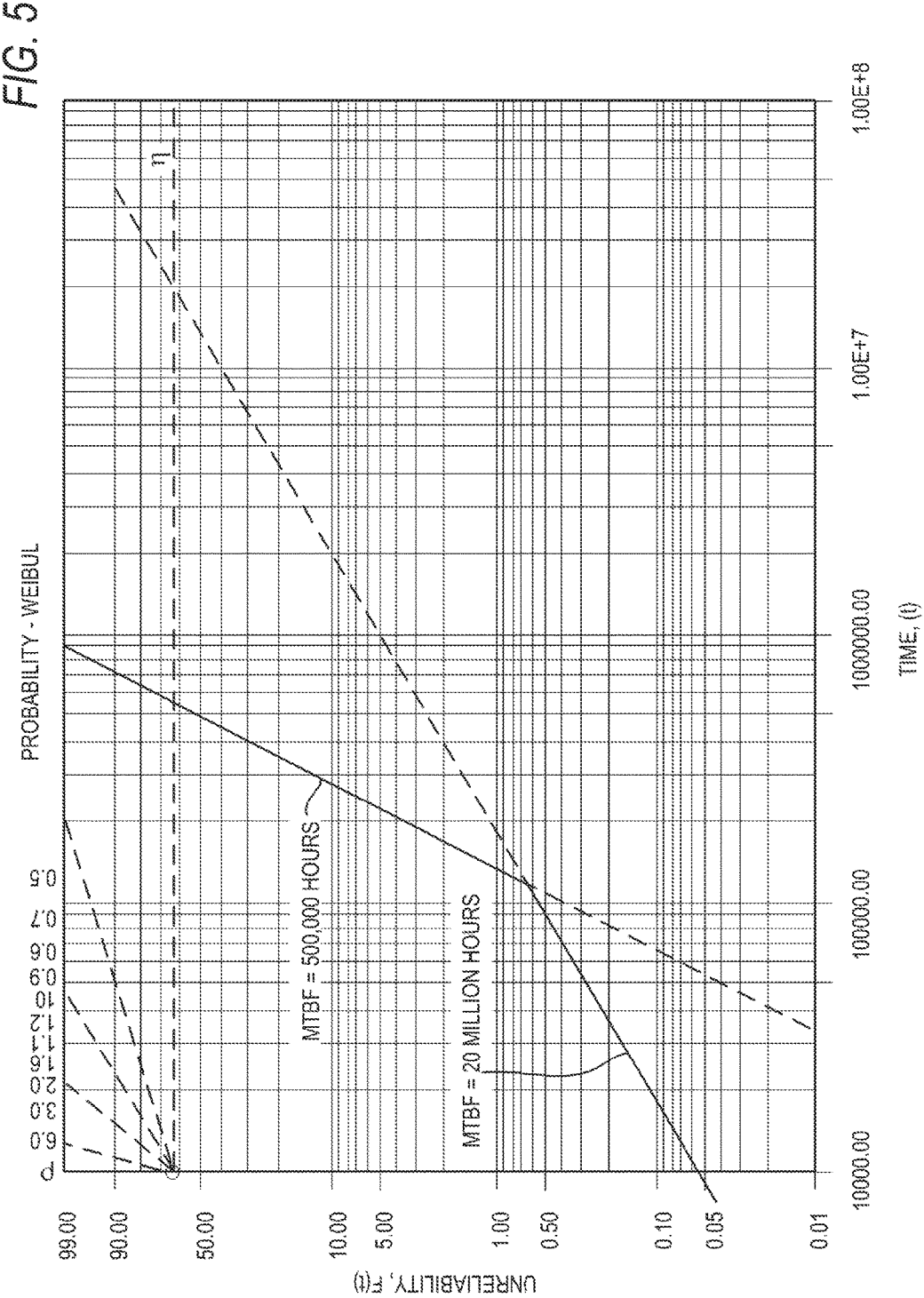
FIG. 5 is a Weibull distribution for normal life and wear-out populations of servo motors.

FIG. 5 shows such a Weibull distribution, in which a product population for a MTBF of 20 million hours, the MTTF is 500,000 hours. Hence, MTTF=1/40×MTBF. Assuming a worst-case scenario of the MTBF at the low end, 10,000 hours, the MTTF would be 250 hours. Further assuming a micro stroke or partial stroke functionality duration of 15 minutes (0.25 hours), and not taking into account the fact that a servo motor does not operate continuously (but rather only draws power during stroking), then with a micro stroke test performed once a week, 52 times×0.25 hours=13 hours/year, and a MTTF would be 250 hours/13 hours/year, or 19.2 years. Similarly, for biweekly testing, MTTF would be 38.5 years, and for monthly testing, MTTF would be 83.3 years. Thus, reliability engineering calculations are that such a micro stroke testing system will offer a long life, and it is evident that the servo motor can be used in a safety loop.

In addition to durability, servo motors can be specified with a mechanical fail-safe position in the event of loss of power or signal. Thus, servo motors are ideal for integration into the system described herein, allowing for micro strokes during normal operations, while allowing for normal fail-safe full strokes during an emergency demand.

Figure 6:
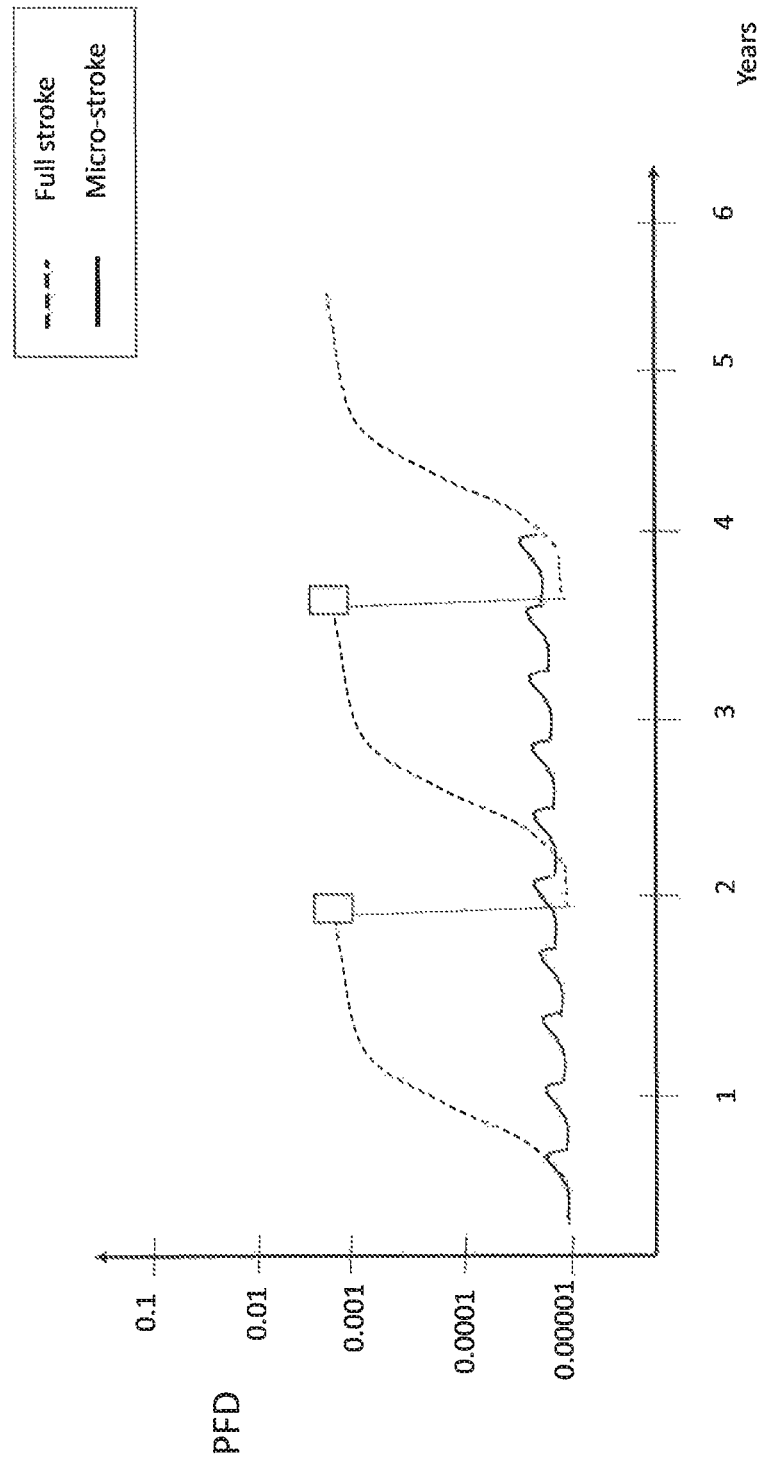
FIG. 6 provides a graph comparing probability of failure on demand versus time for full stroke tests and micro stroke tests.

FIG. 6 shows the probability of failure on demand (PFD) versus time for full stroke tests and for micro stroke tests. For a full stroke test, the PFD at time 0 is approximately 0.00001, and climbs to approximately 0.001 after one year. After successful completion of the full stroke test, shown at two years, the PFD again drops to 0.00001. In other words, if the test were to be repeated immediately at that point, the PFD would be approximately 0.00001. The PFD then begins climbing as it had from time 0. One concern is that a PFD of 0.001 may be considered unacceptable by a system designer or operator.

For a micro stroke test, upon successful completion of a demand, the probability of failure on the next demand also drops to approximately 0.00001, and then increases with the passage of time, until a successful completion of the next demand, at which the PFD drops again to 0.00001. However, because a micro stroke test is performed at least twice a year, as opposed to every two years, the PFD will remain close to 0.00001, rather than climbing as high as the PFD of 0.001 that can be experienced for a full stroke test protocol. Therefore, it can be seen that a protocol of more frequent micro stroke tests results in the PFD remaining at lower levels.

Although various embodiments that incorporate the teachings of the present invention have been illustrated in the figures and described in detail, other and varied embodiments will be apparent to those of ordinary skill in the art and the scope of the invention is to be determined by the claims that follow.

We claim:

1. A valve integrity manager for conducting micro stroke tests of an emergency shutdown valve controlled by a double-acting actuator, wherein a micro stroke is a range of travel as low as 1% of the range of the emergency shutdown valve, and wherein a micro stroke test drives the emergency shutdown valve to approximately 1-5% of closure, the valve integrity manager comprising:
   a non-volatile memory for storing program modules and data;
   a processor coupled to the non-volatile memory;
   a control program module stored in the non-volatile memory and executed by the processor, that:
      in the event of a safety demand for the emergency shutdown valve, directs the transmission of an emergency shutdown signal from the valve integrity manager to a three-way solenoid valve such that a pilot valve will be switched to supply pneumatic or hydraulic fluid to the double-acting actuator to close the emergency shutdown valve, and that
      in the event of a micro stroke test, directs the valve integrity manager to provide electrical power and a control signal to a servo or stepper valve and receives a position feedback signal from the servo or stepper valve, wherein the servo or stepper valve controls the pneumatic or hydraulic fluid supply via the pilot valve to the double-acting actuator, thereby adjusting a percentage of closure of the emergency shutdown valve by a predetermined percentage;
   a measurement program module stored in the non-volatile memory and executed by the processor, that records a signal from a position transmitter located on the emergency shutdown valve that represents the true percentage of closure of the emergency shutdown valve, and that records a signal from a differential pressure transmitter installed across the emergency shutdown valve; and
   an analysis program module stored in the non-volatile memory and executed by the processor, that compares that recorded true percentage of closure with the percentage of closure commanded by the control program module and that compares the recorded differential pressure with a predetermined differential pressure predicted for the percentage of closure commanded by the control program module.

2. The valve integrity manager of claim 1, further comprising a scheduler and configuration program module stored in the non-volatile memory and executed by the processor, that accepts input from a user for scheduling a planned time and periodicity for the micro stroke test of the emergency shutdown valve.

3. The valve integrity manager of claim 1, wherein in the event of a safety demand for the emergency shutdown valve, if the analysis program module determines that the safety valve has jammed, the control program module will, based upon a predetermined logic sequence, direct the transmission of a second emergency shutdown signal from the valve integrity manager to the three-way solenoid valve.

4. The valve integrity manager of claim 1, wherein in the event of a safety demand for the emergency shutdown valve, if the analysis program module determines that the safety valve has jammed, the control program module will direct the transmission of a signal to open by a predetermined percentage the three-way solenoid valve that controls the pneumatic or hydraulic fluid supply to the double-acting actuator of the emergency shutdown valve, and the control program module will then to transmit a signal to fully close that three-way solenoid valve.

5. The valve integrity manager of claim 4, wherein the original emergency shutdown signal will command a first speed of closure, and wherein the signal to fully close the solenoid valve following the determination that the safety valve has jammed will command a second speed of closure that is different from the first speed of closure.

6. The valve integrity manager of claim 4, wherein the original emergency shutdown signal will command a first force of closure by the pneumatic or hydraulic fluid, and wherein the signal to fully close the solenoid valve following the determination that the safety valve has jammed will command a second force of closure that is different from the first force of closure.

7. The valve integrity manager of claim 1, wherein in the event of a micro stroke test of the emergency shutdown valve, if the analysis program module determines that the safety valve has jammed or has not attained the predetermined percentage of closure, the control program module will, based upon a predetermined logic sequence, retry directing the valve integrity manager to move the emergency shutdown valve by the predetermined percentage of closure.

8. The valve integrity manager of claim 7, wherein the original micro stroke test control signal will command a first speed of closure, and wherein the signal to retry directing the valve integrity manager to move the emergency shutdown valve will command a second speed of closure that is different from the first speed of closure.

9. The valve integrity manager of claim 7, wherein the original micro stroke test control signal will command a first force of closure, and wherein the signal to retry directing the valve integrity manager to move the emergency shutdown valve will command a second force of closure that is different from the first force of closure.

10. The valve integrity manager of claim 1, wherein in the event of a micro stroke test for the emergency shutdown valve, the analysis program manager measures a first time for the emergency shutdown valve to reach the commanded adjustment of percentage of closure, and if the measured time is longer than a predetermined time, the analysis program module repeats the micro stroke test and measures a second time for the emergency shutdown valve to reach the commanded adjustment of percentage of closure.

11. A smart servo or stepper valve, for integration with a valve integrity manager for conducting micro stroke tests of an emergency shutdown valve controlled by a double-acting actuator, wherein a micro stroke is a range of travel as low as 1% of the range of the emergency shutdown valve, and wherein a micro stroke test drives the emergency shutdown valve to approximately 1-5% of closure, the smart servo or stepper valve comprising:
a motor with an output shaft;
a valve connected to the output shaft;
control circuitry;
a potentiometer connected to an output shaft;
a non-volatile memory for storing program modules and data;
a processor coupled to the non-volatile memory;
a control program module stored in the non-volatile memory and executed by the processor, that:
in the event of a safety demand for the emergency shutdown valve, directs the transmission of an emergency shutdown signal to a three-way solenoid valve such that a pilot valve will be switched to supply pneumatic or hydraulic fluid to the double-acting actuator to close the emergency shutdown valve, and that
in the event of a micro stroke test, provides electrical power and a control signal to a servo or stepper valve and receives a position feedback signal from the servo or stepper valve, wherein the servo or stepper valve controls the pneumatic or hydraulic fluid supply via the pilot valve to the double-acting actuator, thereby adjusting a percentage of closure of the emergency shutdown valve by a predetermined percentage;
a measurement program module stored in the non-volatile memory and executed by the processor, that records a signal from a position transmitter located on the emergency shutdown valve that represents the true percentage of closure of the emergency shutdown valve, and that records a signal from a differential pressure transmitter installed across the emergency shutdown valve; and
an analysis program module stored in the non-volatile memory and executed by the processor, that compares that recorded true percentage of closure with the percentage of closure commanded by the control program module and that compares the recorded differential pressure with a predetermined differential pressure predicted for the percentage of closure commanded by the control program module.

12. The smart servo or stepper valve of claim 11, further comprising a scheduler and configuration program module stored in the non-volatile memory and executed by the processor, that accepts input from a user for scheduling a planned time and periodicity for the micro stroke test of the emergency shutdown valve.

13. A valve integrity manager for conducting micro stroke tests of an emergency shutdown valve controlled by a single-acting actuator, wherein a micro stroke is a range of travel as low as 1% of the range of the emergency shutdown valve, and wherein a micro stroke test drives the emergency shutdown valve to approximately 1-5% of closure, the valve integrity manager comprising:
a non-volatile memory for storing program modules and data;
a processor coupled to the non-volatile memory;

a control program module stored in the non-volatile memory and executed by the processor, that:
  in the event of a safety demand for the emergency shutdown valve, directs the transmission of an emergency shutdown signal from the valve integrity manager to a three-way solenoid valve such that a pneumatic or hydraulic fluid supply to the single-acting actuator will be interrupted, fully exercising a quick-exhaust valve connected to the three-way solenoid valve and allowing the emergency shutdown valve to close via energy stored by a compressed spring within the single-acting actuator, and that
  in the event of a micro stroke test, initiates electrical power and a control signal from the valve integrity manager to a servo or stepper valve, and receives a position feedback signal from the servo or stepper valve, wherein the servo or stepper valve controls the pneumatic or hydraulic fluid supply via the three-way solenoid valve to the single-acting actuator, thereby adjusting a percentage of closure of the emergency shutdown valve by a predetermined percentage;
a measurement program module stored in the non-volatile memory and executed by the processor, that records a signal from a position transmitter located on the emergency shutdown valve that represents the true percentage of closure of the emergency shutdown valve, and that records a signal from a differential pressure transmitter installed across the emergency shutdown valve; and
an analysis program module stored in the non-volatile memory and executed by the processor, that compares that recorded true percentage of closure with the percentage of closure commanded by the control program module and that compares the recorded differential pressure with a predetermined differential pressure predicted for the percentage of closure commanded by the control program module.

14. The valve integrity manager of claim 13, further comprising a scheduler and configuration program module stored in the non-volatile memory and executed by the processor, that accepts input from a user for scheduling a planned time and periodicity for the micro stroke test of the emergency shutdown valve.

15. The valve integrity manager of claim 13, wherein in the event of a safety demand for the emergency shutdown valve, if the analysis program module determines that the safety valve has jammed, the control program module will, based upon a predetermined logic sequence, direct the transmission of a second emergency shutdown signal from the valve integrity manager to the three-way solenoid valve.

16. The valve integrity manager of claim 13, wherein in the event of a safety demand for the emergency shutdown valve, if the analysis program module determines that the safety valve has jammed, the control program module will direct the transmission of a signal from the valve integrity manager to the three-way solenoid valve to open by a predetermined percentage, and then to transmit a signal to fully close that three-way solenoid valve.

17. The valve integrity manager of claim 13, wherein in the event of a micro stroke test of the emergency shutdown valve, if the analysis program module determines that the safety valve has jammed or has not attained the predetermined percentage of closure, the control program module will, based upon a predetermined logic sequence, retry directing the valve integrity manager to move the emergency shutdown valve by the predetermined percentage of closure.

18. The valve integrity manager of claim 17, wherein the original micro stroke test control signal will command a first speed of closure, and wherein the signal to retry directing the valve integrity manager to move the emergency shutdown valve will command a second speed of closure that is different from the first speed of closure.

19. The valve integrity manager of claim 17, wherein the original micro stroke test control signal will command a first force of closure, and wherein the signal to retry directing the valve integrity manager to move the emergency shutdown valve will command a second force of closure that is different from the first force of closure.

20. The valve integrity manager of claim 1, wherein in the event of a micro stroke test for the emergency shutdown valve, the analysis program manager measures a first time for the emergency shutdown valve to reach the commanded adjustment of percentage of closure, and if the measured time is longer than a predetermined time, the analysis program module repeats the micro stroke test and measures a second time for the emergency shutdown valve to reach the commanded adjustment of percentage of closure.

21. A smart servo or stepper valve, for integration with a valve integrity manager for conducting micro stroke tests of an emergency shutdown valve controlled by a single-acting actuator, wherein a micro stroke is a range of travel as low as 1% of the range of the emergency shutdown valve, and wherein a micro stroke test drives the emergency shutdown valve to approximately 1-5% of closure, the smart servo or stepper valve comprising:
  a motor with an output shaft;
  a valve connected to the output shaft;
  control circuitry;
  a potentiometer connected to an output shaft;
  a non-volatile memory for storing program modules and data;
  a processor coupled to the non-volatile memory;
  a control program module stored in the non-volatile memory and executed by the processor, that:
    in the event of a safety demand for the emergency shutdown valve, directs the transmission of an emergency shutdown signal from the valve integrity manager to a three-way solenoid valve such that a pneumatic or hydraulic fluid supply to the single-acting actuator will be interrupted, fully exercising a quick-exhaust valve connected to the three-way solenoid valve and allowing the emergency shutdown valve to close via energy stored by a compressed spring within the single-acting actuator, and that
    in the event of a micro stroke test, initiates electrical power and a control signal from the valve integrity manager to a servo or stepper valve, and receives a position feedback signal from the servo or stepper valve, wherein the servo or stepper valve controls the pneumatic or hydraulic fluid supply via the three-way solenoid valve to the single-acting actuator, thereby adjusting a percentage of closure of the emergency shutdown valve by a predetermined percentage;
  a measurement program module stored in the non-volatile memory and executed by the processor, that records a signal from a position transmitter located on the emergency shutdown valve that represents the true percentage of closure of the emergency shutdown valve, and that records a signal from a differential pressure transmitter installed across the emergency shutdown valve; and an analysis program module stored in the non-volatile memory and executed by the processor, that compares that recorded true percentage of closure with the percentage of closure commanded by the control program module and that compares the recorded differential pressure with a predetermined differential pressure predicted for the percentage of closure commanded by the control program module.

22. The smart servo or stepper valve of claim 21, further comprising a scheduler and configuration program module stored in the non-volatile memory and executed by the processor, that accepts input from a user for scheduling a planned time and periodicity for the micro stroke test of the emergency shutdown valve.

\* \* \* \* \*